(12) United States Patent
Gu

(10) Patent No.: US 10,663,801 B2
(45) Date of Patent: May 26, 2020

(54) ALIGNMENT AGENT, MANUFACTURING METHOD OF ALIGNMENT FILM, DISPLAY PANEL AND DISPLAY DEVICE

(71) Applicant: BOE Technology Group Co., Ltd., Beijing (CN)

(72) Inventor: Xin Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 268 days.

(21) Appl. No.: 15/539,839

(22) PCT Filed: May 18, 2016

(86) PCT No.: PCT/CN2016/082491
§ 371 (c)(1),
(2) Date: Jun. 26, 2017

(87) PCT Pub. No.: WO2017/143674
PCT Pub. Date: Aug. 31, 2017

(65) Prior Publication Data
US 2018/0095308 A1 Apr. 5, 2018

(30) Foreign Application Priority Data

Feb. 23, 2016 (CN) .......................... 2016 1 0098730

(51) Int. Cl.
*G02F 1/1337* (2006.01)
*C09K 19/56* (2006.01)
(Continued)

(52) U.S. Cl.
CPC ............ *G02F 1/1337* (2013.01); *C08L 79/08* (2013.01); *C09D 179/08* (2013.01); *C09K 19/56* (2013.01);
(Continued)

(58) Field of Classification Search
CPC ............ G02F 1/1337; G02F 1/133723; G02F 1/133784; G02F 1/133788
(Continued)

(56) References Cited

U.S. PATENT DOCUMENTS

| 2006/0280880 A1* | 12/2006 | Park | G02F 1/133784 428/1.1 |
| 2006/0280881 A1* | 12/2006 | Park | G02F 1/133711 428/1.26 |
| 2013/0101755 A1* | 4/2013 | Lee | G02F 1/133707 428/1.23 |

FOREIGN PATENT DOCUMENTS

| CN | 1187521 A | 7/1998 |
| CN | 101730862 A | 6/2010 |

(Continued)

OTHER PUBLICATIONS

Computer-generated translation of WO 2009/017252 (Feb. 2009). (Year: 2009).*

(Continued)

*Primary Examiner* — John A McPherson
(74) *Attorney, Agent, or Firm* — Banner & Witcoff, Ltd.

(57) ABSTRACT

In one aspect, provided herein is a method comprising: (a) (i) determining cytolytic activity in a tumor from the subject; and/or (ii) determining genetic alterations associated with cytolytic activity in the tumor; and (b) administering an immunotherapeutic agent to the subject if (i) cytolytic activity is detected in the tumor and/or (ii) a genetic alteration associated with induction of cytolytic activity, tumor resistance to cytolytic activity and/or suppression of cytolytic activity is detected in the tumor.

4 Claims, 2 Drawing Sheets

(51) Int. Cl.
*C09D 179/08* (2006.01)
*C08L 79/08* (2006.01)
*G02F 1/1335* (2006.01)

(52) U.S. Cl.
CPC .. *G02F 1/133514* (2013.01); *G02F 1/133723* (2013.01); *G02F 1/133784* (2013.01); *G02F 1/133788* (2013.01)

(58) Field of Classification Search
USPC ........ 430/320, 321; 349/124, 126, 132, 135, 349/136
See application file for complete search history.

(56) References Cited

FOREIGN PATENT DOCUMENTS

| | | |
|---|---|---|
| CN | 102093560 A | 6/2011 |
| CN | 103080153 A | 5/2013 |
| CN | 103320146 A | 9/2013 |
| CN | 103911163 A | 7/2014 |
| CN | 104020613 A | 9/2014 |
| CN | 104345499 A | 2/2015 |
| CN | 104536208 A | 4/2015 |
| CN | 104884533 A | 9/2015 |
| CN | 105567257 A | 5/2016 |
| CN | 105567258 A | 5/2016 |
| JP | 2000297082 A | 10/2000 |
| JP | 2007002065 A | 1/2007 |
| KR | 100213178 B1 | 8/1999 |
| WO | WO 2009/017252 * | 2/2009 |

OTHER PUBLICATIONS

Mar. 30, 2018—(CN) Third Office Action Appn 201610098730.9 with English Tran.
Nov. 29, 2016—(WO) International Search Report and Written Opinion Appn PCT/CN2016/082491 with English Tran.
Jul. 3, 2017—(CN) First Office Action Appn 201610098730.9 with English Tran.
Oct. 23, 2017—(CN) Second Office Action Appn 201610098730.9 with English Tran.

* cited by examiner

ALIGNMENT AGENT, MANUFACTURING METHOD OF ALIGNMENT FILM, DISPLAY PANEL AND DISPLAY DEVICE

The application is a U.S. National Phase Entry of International Application No. PCT/CN2016/082491 filed on May 18, 2016, designating the United States of America and claiming priority to Chinese Patent Application No. 201610098730.9, filed Feb. 23, 2016. The present application claims priority to and the benefit of the above-identified applications and the above-identified applications are incorporated by reference herein in their entirety.

TECHNICAL FIELD

The present disclosure relates to alignment agent, a manufacturing method of an alignment film, a display panel and a display device.

BACKGROUND

A liquid crystal display device has advantages of low power, no radiation and so on, which occupies a dominant position in flat panel display field.

A liquid crystal display panel of a current liquid crystal display device mainly comprises an array substrate and a color filter substrate that are disposed opposite to each other, and a liquid crystal layer filled between the array substrate and the color film substrate. Both sides of the liquid crystal layer are provided with alignment film, and the function of the alignment film is to make a liquid crystal molecule in the liquid crystal layer oriented, in order to realize display function.

In an existing manufacturing process of an alignment film, a rubbing alignment technique is most widely used. The rubbing alignment technique is capable of producing a better orientation effect, but there is also unavoidable defect, such as easy to produce uneven rubbing (rubbing mura) and other undesirable problems. Optical alignment (OA) technique is emerged currently, and it is capable of producing uniform alignment in a liquid crystal layer. However, anchoring energy of the optical alignment is weak, and it is easy to produce poor alignment.

SUMMARY

An embodiment of the present disclosure provides alignment agent, which comprises polyimide and a material capable of being polymerized under illumination.

In one example, the material capable of being polymerized under illumination comprises a small molecule material capable of being polymerized under illumination.

In one example, the small molecule material capable of being polymerized under illumination comprises a light reactive material.

In one example, the light reactive material has a mass fraction of 1%~10% in the alignment agent.

In one example, the light reactive material comprises at least one selected from the group consisted of cinnamoyl, ether two amine, fluorene diamine, and coumarin.

In one example, the material capable of being polymerized under illumination is uniformly dispersed in the polyimide.

An embodiment of the present disclosure further provides a manufacturing method of an alignment film, comprising: coating the alignment agent as mentioned above on a substrate; performing a rubbing alignment process for the alignment agent on the substrate; illuminating the alignment agent on the substrate.

In one example, the substrate comprises a first substrate and a second substrate, after performing the rubbing alignment process for the alignment agent on the first substrate and the second substrate, the manufacturing method further comprising: dripping a liquid crystal material on the first substrate, and cell assembling the first substrate and the second substrate; illuminating the alignment agent on the substrate comprising: applying an electric field to the liquid crystal material so that a liquid crystal molecule in the liquid crystal material is arranged in a predetermined direction, and illuminating the alignment agent on the first substrate and the second substrate upon the electric field being applied.

In one example, the first substrate is provided with a first electrode layer, the second substrate is provide with a second electrode layer, a voltage is applied between the first electrode layer and the second electrode layer so that the electric field is applied to the liquid crystal material.

In one example, the liquid crystal material comprises a negative liquid crystal, the first substrate is an array substrate which comprises a pixel electrode layer and a common electrode layer, the second substrate is a color filter substrate, the first electrode layer is the pixel electrode layer or the common electrode layer.

An embodiment of the present disclosure further provides a display panel, comprising a first substrate and a second substrate that are disposed opposite to each other, and a liquid crystal layer located between the first substrate and the second substrate, a first alignment film is provided on a side of the first substrate facing the liquid crystal layer, a second alignment film is provided on a side of the second substrate facing the liquid crystal layer, wherein, at least one of the first alignment film and the second alignment film is made of the alignment agent as mentioned above.

In one example, the first substrate is provided with a first electrode layer for making an alignment film, the second substrate is provided with a second electrode layer for making an alignment film.

In one example, a liquid crystal material of the liquid crystal layer is an array substrate which comprises a negative liquid crystal, the first substrate comprises a pixel electrode layer and a common electrode layer, the second substrate is a color filter substrate, the first electrode layer is the pixel electrode layer or the common electrode layer.

In one example, a pre-tilt angle of a liquid crystal molecule in the liquid crystal layer is less than 2 degrees.

BRIEF DESCRIPTION OF THE DRAWINGS

In order to clearly illustrate the technical solution of embodiments of the disclosure, the drawings of the embodiments will be briefly described in the following; it is obvious that the drawings in the description are only related to some embodiments of the disclosure and not limited to the disclosure.

DETAILED DESCRIPTION

In order to make objects, technical details and advantages of embodiments of the disclosure, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

An embodiment of the present disclosure provides an alignment agent, which comprises polyimide (PI liquid) and a material capable of being polymerized under illumination.

For example, the material capable of being polymerized under illumination may comprise a small molecule material capable of being polymerized under illumination.

For example, the small molecule material capable of being polymerized under illumination comprises a light reactive material (short for RM). The light reactive material in the alignment agent has a mass fraction of 1%~10%. For example, the mass fraction may be 3%, 6%, 8% and so on. For example, the light reactive material comprises at least one selected from the group consisted of cinnamoyl, ether two amine, fluorene diamine, and coumarin.

In some examples, the material capable of being polymerized under illumination is uniformly dispersed in the polyimide.

The alignment agent provided by the embodiment of the present disclosure is formed by addition of the material capable of being polymerized under illumination in the polyimide. In a case that the alignment agent is used to prepare an alignment film, the material capable of being polymerized as mentioned above may be polymerized under illumination so as to compensate for a problem of uneven rubbing caused by a rubbing alignment process. Compared with a conventional optical alignment technique, the alignment film made with the alignment agent as mentioned above has stronger anchoring force.

Furthermore, at least one embodiment of the present disclosure further provides a manufacturing method an alignment film, comprising:

S11: coating the alignment agent as mentioned above on a substrate;

S12: performing a rubbing alignment process for the alignment agent on the substrate;

S13: illuminating the alignment agent on the substrate.

Figure 1:
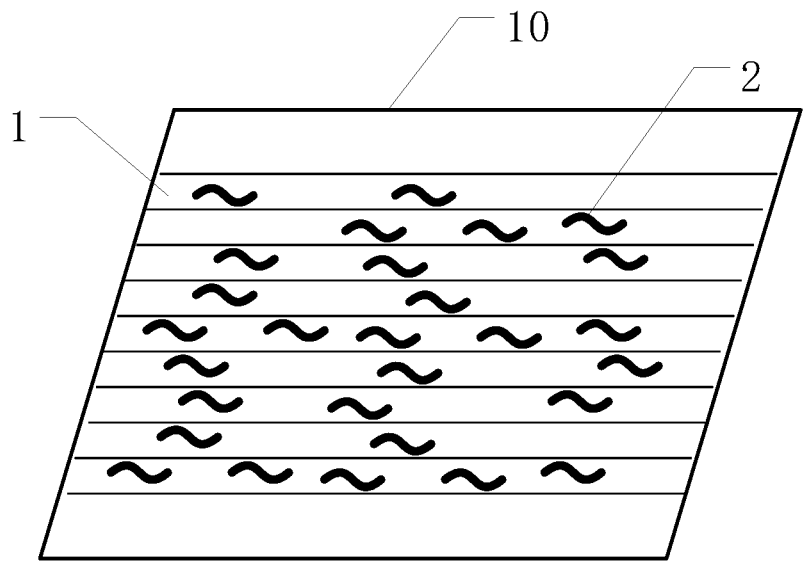
FIGS. 1-2 are schematic diagrams of a manufacturing method of an alignment film provided by at least one embodiment of the present disclosure.
Figure 2:
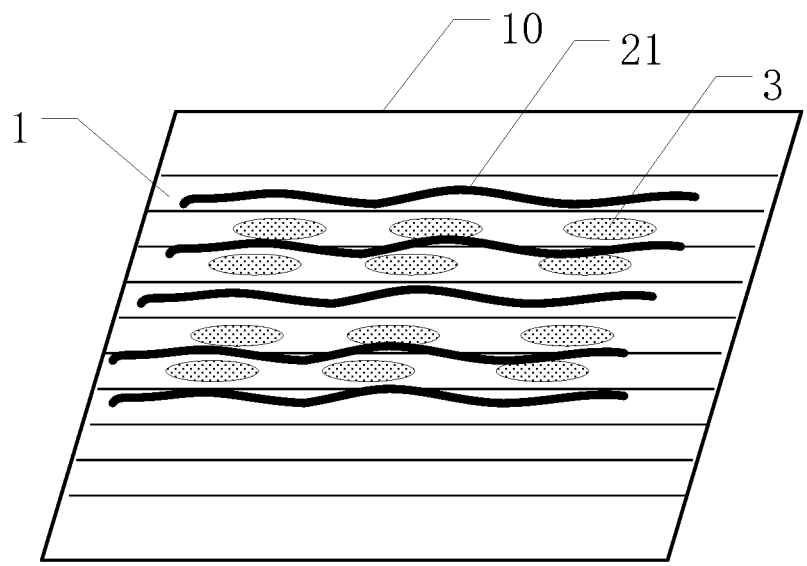

For example, a small molecule material capable of being polymerized under illumination in the alignment agent is a light reactive material. In some examples, the small molecule material capable of being polymerized under illumination in the alignment agent is an ultraviolet light reactive material, that is, the small molecule material may undergo polymerization under ultraviolet illumination. After coating the alignment agent on the substrate, the rubbing alignment process may be carried out first, as illustrated in FIG. 1, the polyimide in the alignment agent forms an alignment groove 1 on the substrate 10 through the rubbing alignment process, and the a liquid crystal material is dripped on the substrate 10, and then the light reactive material in the alignment agent may undergo polymerization under ultraviolet illumination, so that a polymer chain 21 may be generated as illustrated in FIG. 2. The formed polymer chain may be further formed into the alignment groove, which can compensate for the problem of uneven rubbing caused by the rubbing alignment process.

For example, after coating the alignment agent on the substrate, pre curing and curing processes of the alignment agent can be carried out before taking the rubbing alignment process.

In the manufacturing process as mentioned above, under the function of the alignment groove 1 formed by the polyimide, a pre-tilt angle of a liquid crystal molecule in a liquid crystal layer may be generally 2 degrees. In order to make the pre-tilt angle of the liquid crystal molecule smaller, preset electric field may be applied to the liquid crystal under illumination. The pre-tilt angle of the liquid crystal molecule may be zero under the action of the electric field. Under illumination, the polymer chain formed by the light reactive material capable of being polymerized is capable of being aligned according to orientation of the liquid crystal molecule. In a case of removing the electric field, the liquid crystal is capable of being arranged according to orientation of the alignment groove formed by the polymer chain. Compared with an alignment film made by a conventional rubbing process, the embodiment of the present disclosure can further reduce the pre-tilt angle of the liquid crystal. That is, an alignment orientation of the polymer chain is affected by the liquid crystal molecule oriented in the electric field.

For example, in a cell assembling process of a liquid crystal display panel, first, coating the alignment agent as mentioned above on a first substrate and a second substrate respectively, and then performing the rubbing alignment process for the alignment agent on the first substrate and the second substrate respectively, and then dripping the liquid crystal material on the first substrate, and cell assembling the first substrate and the second substrate. After cell assembling, applying the electric field to the liquid crystal material between the two substrates, so that the liquid crystal molecule in the liquid crystal material is arranged in a predetermined direction, and illuminating the alignment agent on the first substrate and the second substrate while the electric field is applied. Thus, needed alignment film is formed on the first substrate and the second substrate respectively.

In some examples, in order to apply the electric field as mentioned above which is used for alignment, the first substrate may be provided with a first electrode layer, the second substrate may be provide with a second electrode layer, a voltage is applied between the first electrode layer and the second electrode layer so that the electric field is applied to the liquid crystal material.

Figure 3:
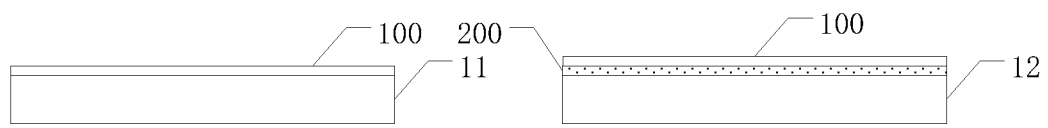
FIGS. 3-5 are schematic diagrams of another manufacturing method of an alignment film provided by at least one embodiment of the present disclosure.
Figure 4:
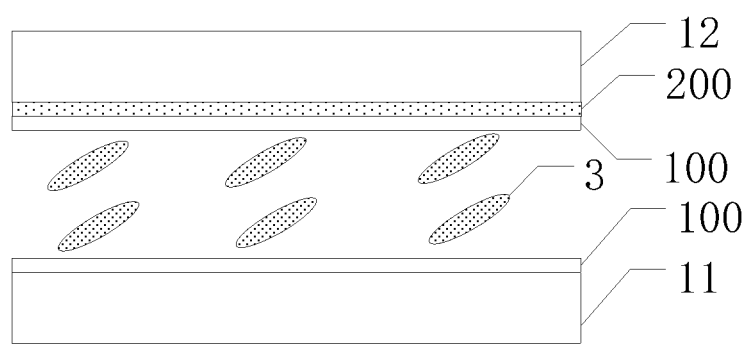
Figure 5:
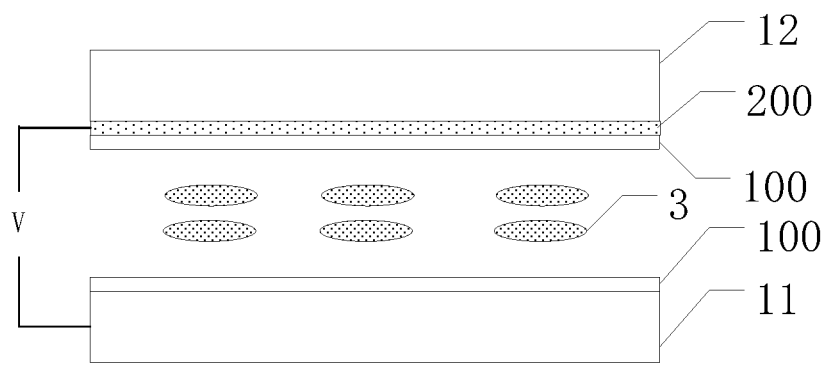

For example, for the display panel with a negative liquid crystal and in a display mode of horizontal electric field mode (such as the display panel in ADS mode, IPS mode or FFS mode), the first substrate as mentioned above may be an array substrate, which comprises a pixel electrode layer and a common electrode layer used for image display; the second substrate may be a color filter substrate, in order to make the alignment film as mentioned above, a transparent conductive layer is additionally arranged on the color filter substrate to be used as the second electrode layer applying the electric field. The pixel electrode layer and the common electrode layer on the array substrate are used as the first electrode layer as mentioned above, in a case that the display panel is under illumination, the liquid crystal molecule may be arranged in a needed direction by applying the voltage between the common electrode layer on the array substrate and the second electrode layer, or between the pixel electrode layer on the array substrate and the second electrode layer. For example, the manufacturing method may be:

S21: as illustrated in FIG. 3, first, using a transparent conductive material (such as ITO) to form the second electrode layer 200 as mentioned above in the color filter substrate 12, and then coating the alignment agent 100 as mentioned above on the array substrate 11 and the color filter substrate 12 respectively, and then performing the rubbing alignment process;

S22: as illustrated in FIG. 4, dripping the liquid crystal material 3 on the array substrate 11, the liquid crystal material 3 including a negative liquid crystal, and coating sealant on the color filter substrate, and then cell assembling the array substrate 11 and the color filter substrate 12, the pre-tilt angle of the liquid crystal molecule in the liquid crystal material 3 being generally 2 degrees under the action of the alignment groove formed by the polyimide;

S23: as illustrated in FIG. 5, electrifying the second electrode layer 200 on the color filter substrate 12 and the common electrode layer on the array substrate 11, in order to produce a vertical electric field (the electric field direction is perpendicular to the array substrate and the color filter substrate). Under the action of the formed vertical electric field, the liquid crystal molecule in the liquid crystal material 3 is arranged in a horizontal direction so that the pre-tilt angle of the liquid crystal molecule is zero. Meanwhile, the alignment agent on the array substrate 11 and the color filter substrate 12 is under ultraviolet (UV) illumination so as to cause the polymerization of the light reactive material in the alignment agent, and the formed polymer chain is capable of being aligned according to the orientation of the liquid crystal molecule. The formed polymer chain is capable of compensating for the problem of uneven rubbing caused by a rubbing alignment process, and the alignment groove formed by the polyimide provides stronger anchoring force.

The manufacturing method provided by the embodiment of the present disclosure, through adding the material capable of being polymerized under the irradiation into the polyimide, the zero pre-tilt angle and alignment stabilization of the liquid crystal can be realized. Compared with the conventional rubbing alignment process, the alignment film made by the embodiment of the present disclosure is capable of achieving a lower pre-tilt angle of the liquid crystal and reducing poor alignment due to the problem of uneven rubbing (rubbing mura). Compared with the conventional optical alignment technique, the alignment film made by the embodiment of the present disclosure has stronger anchoring force, and with simple operation and high production feasibility.

An embodiment of the present disclosure further provides a display panel, which comprises a first substrate and a second substrate that are disposed opposite to each other, and a liquid crystal layer located between the first substrate and the second substrate, a first alignment film is provided on a side of the first substrate facing the liquid crystal layer, a second alignment film is provided on a side of the second substrate facing the liquid crystal layer, wherein, at least one of the first alignment film and the second alignment film is made of the alignment agent as mentioned above.

In some examples, the first substrate is provided with a first electrode layer for making an alignment film, the second substrate is provided with a second electrode layer for making an alignment film.

In some examples, a liquid crystal material of the liquid crystal layer comprises a negative liquid crystal so as to improve transmittance of the display panel. The first substrate is an array substrate which comprises a pixel electrode layer and a common electrode layer, the second substrate is a color filter substrate, the first electrode layer is the pixel electrode layer or the common electrode layer.

Furthermore, an embodiment of the present disclosure further provides a display device, which comprises the display panel as mentioned above. The display device provided by the embodiment of the present disclosure may be laptop screen, liquid crystal display, liquid crystal television, digital photo frame, mobile phone, tablet PC and any product or component with display function.

What are described above is related to the illustrative embodiments of the disclosure only and not limitative to the scope of the disclosure; the scopes of the disclosure are defined by the accompanying claims.

The application claims priority to the Chinese patent application No. 201610098730.9, filed Feb. 23, 2016, the entire disclosure of which is incorporated herein by reference as part of the present application.

The invention claimed is:

1. A manufacturing method of an alignment film, comprising:
   coating an alignment agent on a substrate, wherein the alignment agent comprises polyimide and a material capable of being polymerized under illumination, wherein the material capable of being polymerized under illumination comprises a small molecule material capable of being polymerized under illumination, the small molecule material capable of being polymerized under illumination comprises a light reactive material, and the light reactive material comprises at least one selected from the group consisting of cinnamoyl, ether two amine, fluorene diamine, and coumarin;
   performing a rubbing alignment process for the alignment agent on the substrate; and
   illuminating the alignment agent on the substrate.

2. The manufacturing method of the alignment film according to claim 1, wherein the substrate comprises a first substrate and a second substrate, wherein after performing the rubbing alignment process, the manufacturing method further comprising: dripping a liquid crystal material on the first substrate, and cell assembling the first substrate and the second substrate, and
   wherein the illuminating the alignment agent on the substrate comprises: applying an electric field to the liquid crystal material so that a liquid crystal molecule in the liquid crystal material is arranged in a predetermined direction, and illuminating the alignment agent on the first substrate and the second substrate upon the electric field being applied.

3. The manufacturing method of the alignment film according to claim 2, wherein the first substrate is provided with a first electrode layer, the second substrate is provide with a second electrode layer, and a voltage is applied between the first electrode layer and the second electrode layer so that the electric field is applied to the liquid crystal material.

4. The manufacturing method of the alignment film according to claim 3, wherein the liquid crystal material comprises a negative liquid crystal, the first substrate is an array substrate which comprises a pixel electrode layer and a common electrode layer, the second substrate is a color filter substrate, and the first electrode layer is the pixel electrode layer or the common electrode layer.

* * * * *